(12) United States Patent
Kashima

(10) Patent No.: US 7,411,645 B2
(45) Date of Patent: Aug. 12, 2008

(54) PHASE DIFFERENCE LAYER LAMINATED BODY AND MANUFACTURING METHOD THEREOF

(75) Inventor: Keiji Kashima, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 44 days.

(21) Appl. No.: 11/602,382

(22) Filed: Nov. 21, 2006

(65) Prior Publication Data

US 2007/0076153 A1 Apr. 5, 2007

Related U.S. Application Data

(63) Continuation of application No. 10/473,215, filed on Oct. 30, 2003, now abandoned.

(30) Foreign Application Priority Data

| Nov. 8, 2001 | (JP) | ............................ 2001-343873 |
| Sep. 4, 2002 | (JP) | ............................ 2002-259150 |
| Nov. 7, 2002 | (WO) | ....................... PCT/JP02/11601 |

(51) Int. Cl.
*G02F 1/1337* (2006.01)
*G02F 1/1335* (2006.01)

(52) U.S. Cl. ........................ 349/129; 349/117; 349/130

(58) Field of Classification Search ................... 349/129
See application file for complete search history.

(56) References Cited

U.S. PATENT DOCUMENTS

| 5,559,617 A | 9/1996 | Mitsui et al. |
| 5,589,963 A | 12/1996 | Gunning, III et al. |
| 5,601,884 A | 2/1997 | Ohnishi et al. |
| 5,631,051 A | 5/1997 | Ito et al. |
| 5,903,330 A | 5/1999 | Fuenfschilling et al. |
| 5,926,241 A | 7/1999 | Gunning, III |
| 5,953,091 A | 9/1999 | Jones et al. |
| 6,067,141 A | 5/2000 | Yamada et al. |
| 6,226,063 B1 | 5/2001 | Hsieh et al. |
| 6,567,144 B1 | 5/2003 | Kim et al. |
| 6,624,863 B1 | 9/2003 | Acosta et al. |

FOREIGN PATENT DOCUMENTS

DE 196 14 210 A1 10/1996

(Continued)

OTHER PUBLICATIONS

P 000676485; "Alignment of Liquid Crystals on the Stretched Polymer Films", Hiroshi Aoyama et al., Mol. Cryst. Liq. Cryst., vol. 72 (Letters), pp. 127-132, 1981.

(Continued)

*Primary Examiner*—Michael H Caley
(74) *Attorney, Agent, or Firm*—Oliff & Berridge, PLC

(57) ABSTRACT

A main object of the invention is to provide a phase difference layer laminated body which has a very high freedom in orienting molecules of its phase difference layer, and which is manufactured with ease.

To achieve the above object, the invention provides a phase difference layer laminated body including a base material having orientability, and a phase difference layer made of a liquid crystal material that can form a nematic phase and formed in a pattern on the base material such as to have refractive index anisotropy.

15 Claims, 8 Drawing Sheets

FOREIGN PATENT DOCUMENTS

| | | |
|---|---|---|
| EP | 0 632 311 A1 | 1/1995 |
| EP | 656 560 A2 | 6/1995 |
| EP | 0 738 906 A2 | 10/1996 |
| EP | 0 772 069 A1 | 5/1997 |
| EP | 0 887 667 A2 | 12/1998 |
| EP | 0 949 533 A2 | 10/1999 |
| GB | 2 324 881 A | 11/1998 |
| GB | 2 337 843 A | 12/1999 |
| JP | A 2-74924 | 3/1990 |
| JP | A 8-234205 | 9/1996 |
| JP | A 8-292432 | 11/1996 |
| JP | A 9-54212 | 2/1997 |
| JP | A 9-68699 | 3/1997 |
| JP | A 9-304740 | 11/1997 |
| JP | A 10-227998 | 8/1998 |
| JP | A 10-253824 | 9/1998 |
| JP | A 11-352487 | 12/1999 |
| JP | A 11-352492 | 12/1999 |
| JP | A 2001-188125 | 7/2001 |
| JP | A 2001-249225 | 9/2001 |

OTHER PUBLICATIONS

XP-002442254, "The mechanism of polymer alignment of liquid-crystal materials", J. M. Geary et al., J. Appl. Phys. 62 (10). Nov. 15, 1987.

PHASE DIFFERENCE LAYER LAMINATED BODY AND MANUFACTURING METHOD THEREOF

This is a Division of application Ser. No. 10/473,215 filed Oct. 30, 2003. The disclosure of the prior applications is hereby incorporated by reference herein in its entirety.

TECHNICAL FIELD

The present invention relates to a phase difference layer laminated body which offers high orientation freedom and allows easy patterning, a manufacturing method thereof, and a liquid crystal display device.

BACKGROUND ART

Phase difference film used for liquid crystal displays and the like is conventionally made of a polymer film which is stretched in certain directions to orient the main chains of the polymer in these directions so that the polymer film exhibits refractive index anisotropy.

According to this method, the polymer film can be provided with refractive index anisotropy with relative ease; the method was excellent in that it enabled easy formation of phase difference films.

However, this method only allows fabrication of phase difference films in which the main chains of polymer are oriented in the directions of stretch, and therefore the problem was that the orientation of resultant phase difference films was limited only to directions parallel to the surface of the phase difference film.

Meanwhile, phase difference films having vertical polymer orientation relative to the surface, or various other orientation directions, are now in demand; the problem with the above method for obtaining phase difference films by stretching polymer films is that it cannot meet such demand because of its little freedom in setting orientation direction.

In a multi-domain type liquid crystal display element, for example, in which each unit cell is divided into a plurality of regions with different directions of liquid crystal directors, optical compensation with the conventional phase difference film was, while favorable in some regions, not necessarily satisfactory in other regions.

DISCLOSURE OF THE INVENTION

The present invention has been devised in view of the above problems, and a main object thereof is to provide a phase difference layer laminated body which has very high freedom of molecular orientation in its phase difference layer and which can be manufactured with ease, a manufacturing method thereof, and a liquid crystal display device.

To achieve the above object, the present invention provides, (1) a phase difference layer laminated body including a base material having orientability, and a phase difference layer made of a liquid crystal material that can form a nematic phase and formed in a pattern on the base material such as to have refractive index anisotropy. According to the invention, since a liquid crystal material that can form a nematic phase is used for the phase difference layer, by suitably selecting the type of liquid crystal material and the base material having orientability, it is possible to determine orientation directions with ease, and therefore the phase difference layer laminated body thus obtained can be applied to various optical elements.

(2) In the above invention (1), it is preferable that the above liquid crystal material that can form a nematic phase is obtained by polymerization of at least one of a polymerizable liquid crystal monomer, a polymerizable liquid crystal oligomer, and a polymerizable liquid crystal polymer. The use of such a polymerizable liquid crystal material allows easy patterning of the phase difference layer and enables highly precise patterning, which is achieved, in a curing step, by irradiating the material with an activating radiation beam for polymerizing the polymerizable liquid crystal material in a certain pattern, followed by development.

(3) In the above invention (1), it is particularly preferable that the above liquid crystal material that can form a nematic phase is obtained by polymerization of a polymerizable liquid crystal monomer. This is because polymerizable liquid crystal monomer can be handled most easily among the polymerizable liquid crystal materials noted above, and therefore it allows relatively easy fabrication of the phase difference layer laminated body.

(4) In the above invention according to any one of (1) to (3), the above base material having orientability may be obtained by forming an oriented film on a transparent substrate. This is because the configuration in which a separate oriented film is provided increases the freedom of orientation direction to a very high degree.

(5) In this case, the above oriented film may be formed in a pattern with portions that are oriented in at least two different directions, the liquid crystal material on the oriented film having refractive index anisotropy conforming to the plurality of orientation directions of this oriented film.

With this construction, a pattern of phase difference portions respectively oriented in different directions can be formed in the same phase difference layer, and therefore it will find various optical applications.

(6) Also, in the above invention according to any one of (1) to (3), the above base material having orientability may be a stretched film. The use of a stretched film for the base material having orientability facilitates the formation of the base material, offering the merit of simplicity of the processing step.

Furthermore, the present invention provides, (7) a method for manufacturing a phase difference layer laminated body, the method including:

a base material preparation step of preparing a base material;

an application step of applying a refractive index anisotropic material having an ability of providing refractive index anisotropy on the base material for forming a refractive index anisotropic material layer;

an orientation processing step of performing orientation processing to the refractive index anisotropic material layer;

an orientation fixing step of fixing the orientation of said refractive index anisotropic material layer that has undergone the orientation processing in the orientation processing step; and a patterning step of giving a pattern to the refractive index anisotropic material layer.

According to the invention, by suitably selecting the refractive index anisotropic material and orientation processing method, it is possible to determine the orientation directions of the refractive index anisotropic material with relative ease, whereby the freedom in design of the resultant phase difference layer laminated body can be much improved.

(8) In the above invention according to (7), it is preferable that the base material is a base material having orientability, the refractive index anisotropic material is a liquid crystal material that can form a nematic phase, and the orientation processing step is a step of maintaining the refractive index anisotropic material layer in a temperature at which the liquid crystal material transforms into a liquid crystal phase. In this case, in the orientation processing step, the orientation processing can be achieved with ease simply by maintaining the liquid crystal material on the base material having orientability in a temperature at which the liquid crystal material transforms into a liquid crystal phase, and by suitably selecting the base material having orientability and liquid crystal material, a phase difference layer laminated body having a very high freedom of orientation direction can be obtained.

(9) In the above invention according to (8), it is preferable that the above liquid crystal material is a material having at least one of a polymerizable liquid crystal monomer, a polymerizable liquid crystal oligomer, and a polymerizable liquid crystal polymer, and that the above orientation fixing step is a step of irradiating, with an activating radiation beam, the material having at least one of the polymerizable liquid crystal monomer, the polymerizable liquid crystal oligomer, and the polymerizable liquid crystal polymer for polymerization thereof. The use of the polymerizable liquid crystal material as a liquid crystal material has the merit that it enables highly precise patterning of the phase difference layer, which is achieved by irradiating the material with an activating radiation beam in a pattern in the orientation fixing step, followed by a development step.

(10) In the above invention according to (8), it is preferable that the above liquid crystal material is a polymerizable liquid crystal monomer. This is because the polymerizable liquid crystal monomer is most favorable in terms of handling among other polymerizable liquid crystal materials.

(11) In the above invention according to (9) or (10), the above activating radiation beam irradiation step may be a step of irradiating the material with the activating radiation beam in a pattern, and the method may further include a development step of developing unpolymerized portions of the liquid crystal material, after the above step of irradiating the material with the activating radiation beam in the pattern. With this arrangement, highly precise patterning of the phase difference layer can readily be performed.

(12) In the above invention according to any of (8) to (11), it is preferable that the above base material having orientability is obtained by forming an oriented film on a transparent substrate, as set forth in claim 12. With such a structure in which a separate oriented film is provided, the liquid crystal material can be oriented in various different directions by suitably selecting the type of oriented film, whereby the freedom in design of the phase difference layer laminated body can be much improved.

(13) In the above invention according to (12), it is preferable that the above oriented film is formed in a pattern with portions that are oriented in at least two different directions, the liquid crystal material on the oriented film having refractive index anisotropy conforming to the plurality of orientation directions of the oriented film. With an oriented film having a pattern of portions that are oriented in two different directions, the single phase difference layer can have portions therein that are oriented in different directions. The merit is therefore the phase difference layer laminated body thus obtained can be used to various optical applications.

(14) In the above invention according to any of (8) to (11), the above base material having orientability may be a stretched film. In this case, an oriented film need not be formed on the base material, and a base material having orientability can readily be processed in the production step, and also the cost of the resultant phase difference layer laminated body can be lowered.

The present invention further provides, (15) a liquid crystal display device that uses the phase difference layer laminated body according to any of claims 1 to 6. The liquid crystal display device of the invention will be of high quality because of the use of the above phase difference layer laminated body.

Furthermore, the present invention provides, (16), a liquid crystal display device comprising: a liquid crystal display element including a liquid crystal layer and comprising a plurality of unit cells that constitute a multiplicity of pixels, liquid crystal molecules on a surface of the liquid crystal layer being orientable in directions of a plurality of different directors within each of the unit cells; and a phase difference optical element arranged at least on one side in a thickness direction of the liquid crystal display element, the phase difference optical element being divided into a plurality of oriented compensation regions in accordance with the directions of the directors for the liquid crystal molecules in the each unit cell, liquid crystal substance being oriented and fixed in each of the oriented compensation regions. Because the molecules are oriented in the directions of a plurality of directors in the liquid crystal layer and the molecules in the phase difference layer (molecules of fixed liquid crystal) are oriented along these directions of the directors and fixed, this liquid crystal display device is capable of precise optical compensation, improves the problem of viewing-angle dependency, and realizes high quality image display.

(17) In the invention according to (16), the each unit cell of the liquid crystal display element may be divided into a plurality of oriented display regions, the liquid crystal molecules on the surface of the liquid crystal layer being oriented in different directions of directors for each of the oriented display regions, and the oriented compensation regions of the phase difference optical element may be formed corresponding to the oriented display regions. By thus forming the oriented compensation regions of the phase difference optical element in accordance with the oriented display regions of the liquid crystal display element, favorable optical compensation can readily be realized.

(18) In the invention according to (17), a plurality of the oriented compensation region may be formed in the phase difference optical element relative to one oriented display region of the unit cell. Thereby, even more precise optical compensation can be achieved.

(19) In the invention according to (17) or (18), the oriented display regions of the liquid crystal display element may be formed in such a manner as to divide each unit cell into four or more sections with an equal angular spacing around a center of said each unit cell.

(20) In the invention according to (16), the liquid crystal molecules on the surface of the liquid crystal layer of the liquid crystal display element may be oriented with the directors in symmetric directions relative to respective centers of the unit cells.

(21) In the invention according to (19) or (20), the oriented compensation regions of the phase difference optical element may be formed in such a manner as to divide each unit cell into four or more sections with an equal angular spacing around a center of the each unit cell.

With the construction according to (19) to (21), the problem of viewing-angle dependency in various viewing directions is improved. If liquid crystal molecules in the liquid crystal display element are oriented in four directions, for example, with the molecules in the phase difference layer being respectively oriented in a favorable manner for each orientation direction, the viewing-angle dependency is lowered and high display quality is achieved.

(22) In the invention according to (21), a pair of 180° opposite oriented compensation regions relative to the center of the each unit cell of the phase difference optical element may be oriented in the same direction. Thereby, while achieving favorable optical compensation, the fabrication of the phase difference optical element is made simpler.

(23) In the invention according to any of (16) to (22), the liquid crystal display element may be driven by a method of any of TN (Twisted Nematic) type, STN (Super Twisted Nematic) type, VA (Vertically Alignment) type, MVA (Multi-domain Vertically Alignment) type, PVA (Patterned Vertically Alignment) type, IPS (In-plane Switching) type, OCB (Optically Compensated Birefringence) type, and ECB (Electrically Controlled Birefringence) type. A liquid crystal display device of one of these types that adopts the construction according to any of (16) to (22) will be of high quality and can be realized with relative ease and certainty.

(24) In the invention according to any of (16) to (23), the phase difference layer laminated body according to any of claims 1 to 6 may be used for the above phase difference optical element.

BEST MODE FOR CARRYING OUT THE INVENTION

The phase difference layer laminated body, and the manufacturing method thereof, according to the invention, will be hereinafter described respectively.

A. Phase Difference Layer Laminated Body

The phase difference layer laminated body of the invention is characterized by having a base material having orientability, and a phase difference layer made of a liquid crystal material that can form a nematic phase and formed on the base material such as to have refractive index anisotropy.

With such a construction of the phase difference layer laminated body of the invention, if the orientability of the base material is such that it can orient liquid crystal at a preset angle relative to the phase difference layer surface, and a phase difference layer laminated body is formed with the use of liquid crystal material that is orientable in such a manner, a phase difference layer oriented at a preset angle to the surface can readily be provided. A phase difference layer laminated body having such a phase difference layer will find new applications in addition to the conventional ones.

Figure 1:
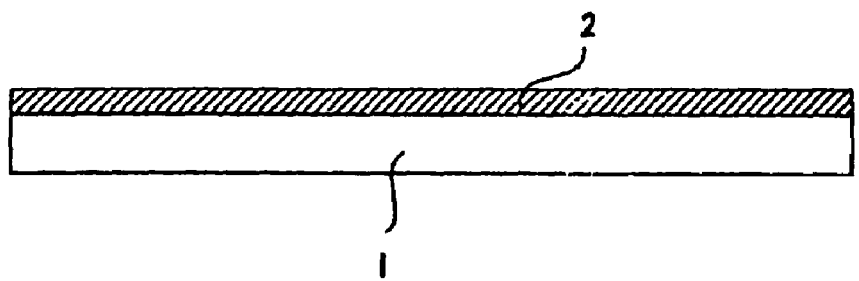
FIG. 1 is a schematic cross-sectional view showing one example of a phase difference layer laminated body of the invention.

This phase difference layer laminated body will further be described below with reference to the drawings. FIG. 1 shows one example of a phase difference layer laminated body of the invention, in a state in which a phase difference layer 2 of liquid crystal material that can form a nematic phase is formed on a base material 1 having surface orientability such that the liquid crystal has refractive index anisotropy.

Figure 2:
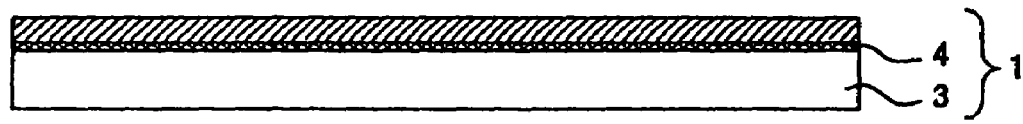
FIG. 2 is a schematic cross-sectional view showing another example of a phase difference layer laminated body of the invention.

The invention includes another construction such as the one shown in FIG. 2 wherein the base material 1 having the above orientability is constituted by a transparent substrate 3 and an oriented film 4 formed thereon. The use of such an oriented film 4 will make the orientation freedom of the phase difference layer 2 extremely high as will be described later, which in turn enhances the orientation freedom of the phase difference layer laminated body to a very high degree.

Figure 3:
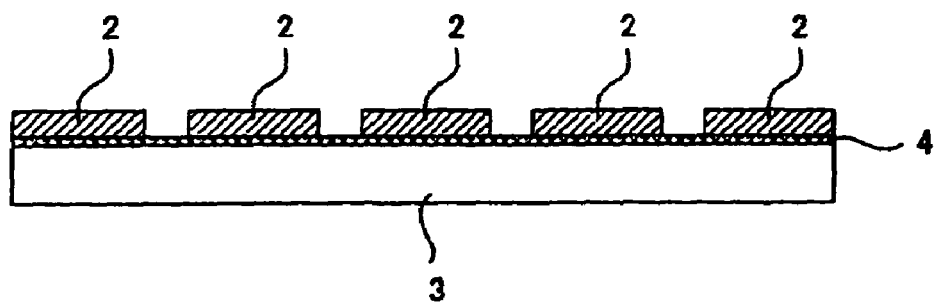
FIG. 3 is a schematic cross-sectional view showing yet another example of a phase difference layer laminated body of the invention.

Also, in the present invention, the phase difference layer formed on the orientated film 4 may have a certain pattern as shown in FIG. 3. A three-dimensional display device or the like, for example, which enables display of three-dimensional images by differing the polarization for the left and right eyes, requires a phase difference layer laminated body having a patterned phase difference layer; the phase difference layer laminated body shown in FIG. 3 can be used in such a three-dimensional display device or the like.

Various elements of the phase difference layer laminated body of the invention are described below in more detail.

1. Phase Difference Layer

The phase difference layer laminated body of the invention is characterized in that a phase difference layer 2 of a liquid crystal material that can form a nematic phase is formed on a base material 1 having orientability such that the liquid crystal has refractive index anisotropy, as shown in FIG. 1.

(Liquid Crystal Material)

For the material forming the phase difference layer, a liquid crystal material is used as noted above. The term "liquid crystal material" in this invention refers to a material that can transform into a liquid crystal phase at a certain temperature; more particularly, this invention is characterized in that this liquid crystal phase of the material is a nematic phase.

In the present invention, as will be described in more detail later under the section of "manufacturing method of a phase difference layer laminated body," a liquid crystal material is transformed into a liquid crystal phase upon a base material having orientability, whereby the liquid crystal molecules in the phase difference layer are oriented to exhibit refractive index anisotropy. Therefore, the upper limit of the above-mentioned temperature should not be limited to a specific value and may be set such that no damage is inflicted on the base material, or, in the case of an oriented film formed on a transparent substrate as will be described later, on the transparent substrate and oriented film. More specifically, a liquid crystal material that transforms into a liquid crystal phase at a temperature of 120° C. or lower, more preferably 100° C. or lower, can favorably be used in respect of easy control of processing temperature and maintenance of dimensional precision.

The lower limit, on the other hand, of the temperature at which the liquid crystal phase forms, should be set so that the liquid crystal material can maintain its orientation, subject to the temperature range for the application as a phase difference layer laminated body.

Here, a liquid crystal material in an application as a phase difference layer laminated body can take two different states: In this invention, both a non-polymerizable polymer liquid crystal material and a polymerizable liquid crystal material can be used as will be described later. In the case of a polymerizable liquid crystal material, when forming the phase difference layer, as will be described in more detail under the section of "manufacturing method of phase difference layer laminated body," polymerization is achieved by irradiating the material with the activating radiation beam. In this case, therefore, the liquid crystal material used in the phase difference layer laminated body has already been polymerized, its orientation being fixed. Namely, in the case of the polymerizable liquid crystal material, there is no limitation on the lower limit of the temperature at which the material transforms into a liquid crystal phase.

On the other hand, in the case of the non-polymerizable polymer liquid crystal material, the liquid crystal phase is in the glass state when used as the phase difference layer laminated body. That is, if it transforms into an isotropic state due to a rise in temperature during storage or use, its orientation will be in disorder and the phase difference layer can no longer be put in use. Thus, in the case of using a non-polymerizable polymer liquid crystal material in the invention, it is preferred that the material transform into an isotropic phase at temperatures equal to or more than a preset value. The lower limit of the temperature at which the material transforms into an isotropic phase in this case depends on the purposes of use, but generally speaking, it is at least 80° C., or more preferably, 100° C. or more.

The liquid crystal material that can form a nematic phase used in this invention can either be a polymerizable liquid crystal material and non-polymerizable polymer liquid crystal material as noted above.

For the polymerizable liquid crystal material, any of polymerizable liquid crystal monomer, polymerizable liquid crystal oligomer, and polymerizable liquid crystal polymer may be used. For the non-polymerizable polymer liquid crystal material, on the other hand, because of the above-mentioned requirement for the maintenance of orientation under various temperatures during storage or use of the phase difference layer laminated body, a liquid crystal material having a relatively high isotropic transition temperature should preferably be used.

In this invention, particularly, a polymerizable liquid crystal material is most preferably used. This is because the use of polymerizable liquid crystal material, whose orientation can be fixed by polymerization that is achieved by irradiating the material with the activating radiation beam as will be described later, enables easy orientation of the liquid crystal at low temperatures, and also because it can be used without temperature limitations or other restrictions due to the fixed orientation when put in use.

More particularly, a polymerizable liquid crystal monomer is preferably used in this invention. This is because a polymerizable liquid crystal monomer lets itself to be oriented at a lower temperature than other polymerizable liquid crystal materials such as polymerizable liquid crystal oligomers or polymers; it also has high orientation sensitivity, allowing the orientation to be readily achieved.

As one example of the polymerizable liquid crystal material, the compounds included in the general formula 1 below or a mixture of two or more of the following compounds may be used. In the case of liquid crystal monomers expressed by the general chemical formula 1, X is preferably an integer of 2 to 5.

[Chemical formula 1]

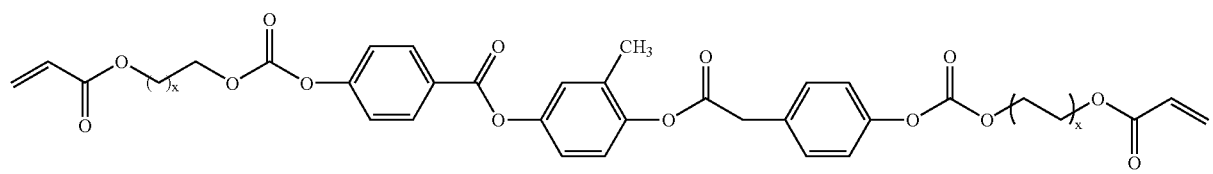

[Chemical formula 2]

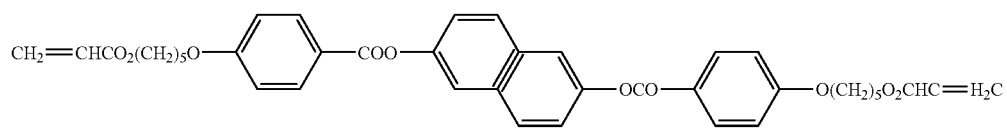

[Chemical formula 3]

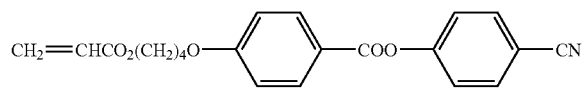

[Chemical formula 4]

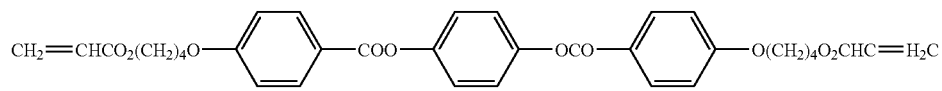

[Chemical formula 5]

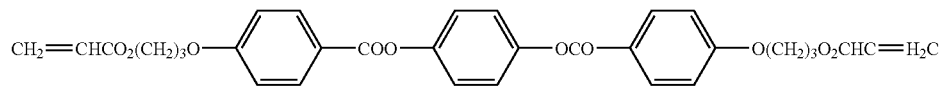

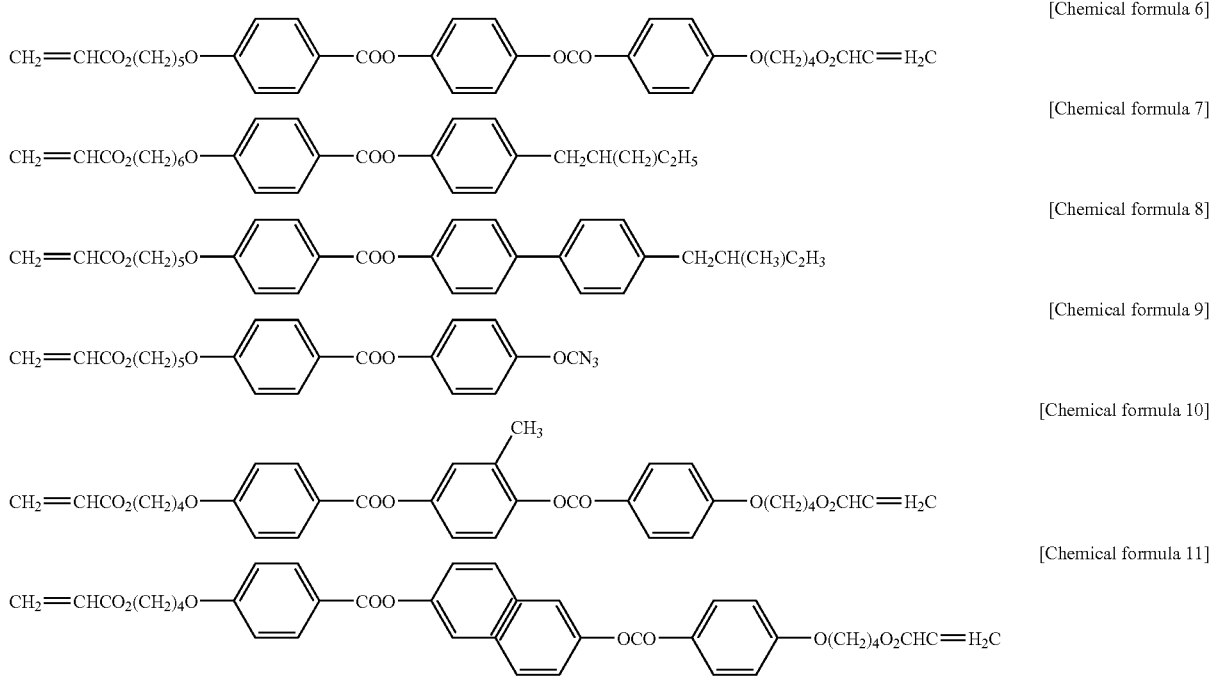

In addition, polymerizable liquid crystal oligomers or polymers can also be used in this invention. Any one of known polymerizable liquid crystal oligomers or polymers may suitably be selected and used.

Furthermore, photopolymerization initiators may be used as required in this invention. Photopolymerization initiator may not always be necessary as with the case with, for example, polymerization of polymerizable liquid crystal material by irradiation of electron beams, but it is normally used for the promotion of polymerization in the commonly used method of curing by irradiation of, e.g., ultraviolet rays.

Also, a sensitizing agent may be added in addition to the photopolymerization initiator, in an amount that does not inhibit achievement of the object of the invention.

Photopolymerization initiator is generally added in a range of 0.01 to 20% by weight; preferably, it is added in a range of 0.1 to 10% by weight, and more preferably 0.5 to 5% by weight, to the polymerizable liquid crystal material of the invention.

On the other hand, non-polymerizable liquid crystal materials can also be used in this invention, as noted above. Any such liquid crystal material can be used as long as it satisfies the requirement that the orientation of liquid crystal does not change during the use or storage thereof as a phase difference layer laminated body as described above; generally, however, polymer material is preferable in terms of the temperatures at which the polymer material transforms into a liquid phase or a liquid crystal phase. Any commonly used liquid crystal material that can form a nematic phase in a liquid crystal phase can be used, including both main-chain and side-chain liquid crystal polymers.

More specifically, typical examples of main-chain liquid crystal polymers are polymers such as polyesters, polyamides, polycarbonates, and polyesterimides.

Further, examples of side-chain liquid crystal polymers are those that have a backbone structure such as polyacrylate, polymethacrylate, polysiloxane, and polymalonate and a low molecular weight liquid crystal compound (mesogen group) comprising a para-substituted cyclic compound or the like as a side chain, with or without a spacer comprising conjugated atoms.

(Refractive Index Anisotropy)

In this invention, the above-mentioned material must be formed into a phase difference layer having refractive index anisotropy. Refractive index anisotropy differs depending on the liquid crystal material being used and the orientability of the base material surface, but the following can generally be said: The difference $\Delta n$, expressed as $\Delta n=|n_x-n_y|$, between the indexes of refraction $n_x$ and $n_y$ in an X axis and Y axis on a plane parallel to the orientation of the polymer, the X-axis being orthogonal and Y-axis being parallel to the orientation direction, should preferably be 0.05 or more, or more preferably 0.1 or more. A phase difference layer having less refractive index anisotropy than that may present a problem in regard to thickness or the like in actual applications.

(Patterned Phase Difference Layer)

In this invention, the phase difference layer formed of the above-mentioned liquid crystal material may have a certain pattern.

A phase difference layer laminated body having a patterned phase difference layer is preferably used in, for example, a three-dimensional liquid crystal display device or the like, wherein unit cells are divided into groups for left and right eyes, which are given different degrees of polarization, thereby creating a three-dimensional image. Such a patterned phase difference layer laminated body was conventionally made by manual cutting and bonding of phase difference layer films comprising common stretched films. Such technique was problematic in terms of cost and had limitations on the formation of highly precise patterns.

The present invention overcomes this problem and provides a phase difference layer laminated body in which a phase difference layer is formed on the base material in a highly precise pattern.

In this invention, the pattern formation method differs depending on the type of liquid crystal material. That is, the pattern formation method for a polymerizable liquid crystal material is different from that for a normal liquid crystal material.

The pattern formation method will be described later in more detail under the section "manufacturing method of a phase difference layer laminated body;" in short, in the case of the polymerizable liquid crystal material, the irradiation of activating radiation beam for the fixing of the orientation of liquid crystal material is made in a certain pattern, and after the polymerization, uncured portions of liquid crystal material are removed by a solvent; patterning of the phase difference layer is thus readily achieved.

In this invention, amongst the polymerizable liquid crystal materials mentioned above, a polymerizable liquid crystal monomer is preferably used because of the ease of the patterning. With a polymerizable liquid crystal monomer, development is easy, the pattern is more clear-cut, and formation of more precise pattern is possible.

On the other hand, a photolithography technique using a photoresist, or a method of applying a normal liquid crystal material in a certain pattern by a nozzle discharge or printing technique may be adopted for the pattern formation method in the case of using a non-polymerizable polymer liquid crystal material.

In the case of forming the phase difference layer laminated body in a pattern, the pattern may be any pattern, for example, striped or zigzagged.

2. Base Material Having Orientability

The phase difference layer laminated body of the invention is comprised of a base material 1 having orientability, on which is formed the above-described phase difference layer 2, as shown in FIG. 1.

For the base material having orientability, there are two cases: One is that the base material 1 itself has orientability, as shown in FIG. 1, and the other is that an oriented film 4 is formed on a transparent substrate 3 as shown in FIG. 2 so that they together function as a base material 1 having orientability. The followings are descriptions of these cases as the first and second embodiments.

a. First Embodiment

In this embodiment, the base material itself has orientability; specifically, the base material is a Y stretched film. With a stretched film, the liquid crystal material can be oriented along a stretched direction of the film. Therefore, the processing of the base material is accomplished simply by preparation of a stretched film, which is a merit that the processing step is made very simple. For the stretched film, any commercially available stretched film can be used, or a stretched film can be made, according to needs, of various materials.

More specifically, examples of the film include films made of thermoplastic polymers, such as polycarbonate polymers, polyester polymers such as polyarylate or polyethylene terephthalate, polyimide polymers, polysulfone polymers, polyethersulfon polymers, polystyrene polymers, polyolefin polymers such as polyethylene or polypropylene, polyvinyl alcohol polymers, cellulose acetate polymers, polyvinyl chloride polymers, and polymethylmethacrylate polymers, and films made of liquid crystal polymers.

In this invention, particularly, polyethylene terephthalate (PET) film is preferably used, because it has a wide range of stretch ratio and is readily available.

The stretch ratio of the stretched film used in this invention is not limited to a particular value, as long as the film exhibits orientability. Thus, even a biaxially stretched film can be used, if the stretch ratio differs between the two axes.

The stretch ratio differs largely depending on the material used, and there are no particular limits to the stretch ratio. Generally, materials having a 150 to 300% stretch ratio can be used; a preferable range is 200 to 250%.

b. Second Embodiment

In the second embodiment, the base material having the above orientability comprises a transparent substrate and an oriented film formed thereon.

With this embodiment, there is a merit that selection of the orientated film enables selection of orientation in a relatively wider range of directions. Selecting the type of liquid applied on the transparent substrate for forming the oriented film allows orientation in various directions and enables even more effective orientation.

An oriented film commonly used for a liquid crystal display device or the like can favorably be used for the oriented film of this embodiment; generally, an oriented film of polyimide that has undergone rubbing treatment is favorably used.

For the transparent substrate used in this embodiment, any transparent material can be used, e.g., a transparent and rigid material having no flexibility such as silica glass, Pyrex (registered trademark) glass, and synthetic silica glass, or a transparent and flexible material such as a transparent resin film, and optical resin sheet or the like.

(Patterning of Orientation on the Oriented Film Surface)

In this embodiment, the above oriented film may have a certain pattern on the surface thereof. That is, the oriented film may have a pattern with different directions of orientation, including portions oriented in, at least two; different directions.

Figure 4:
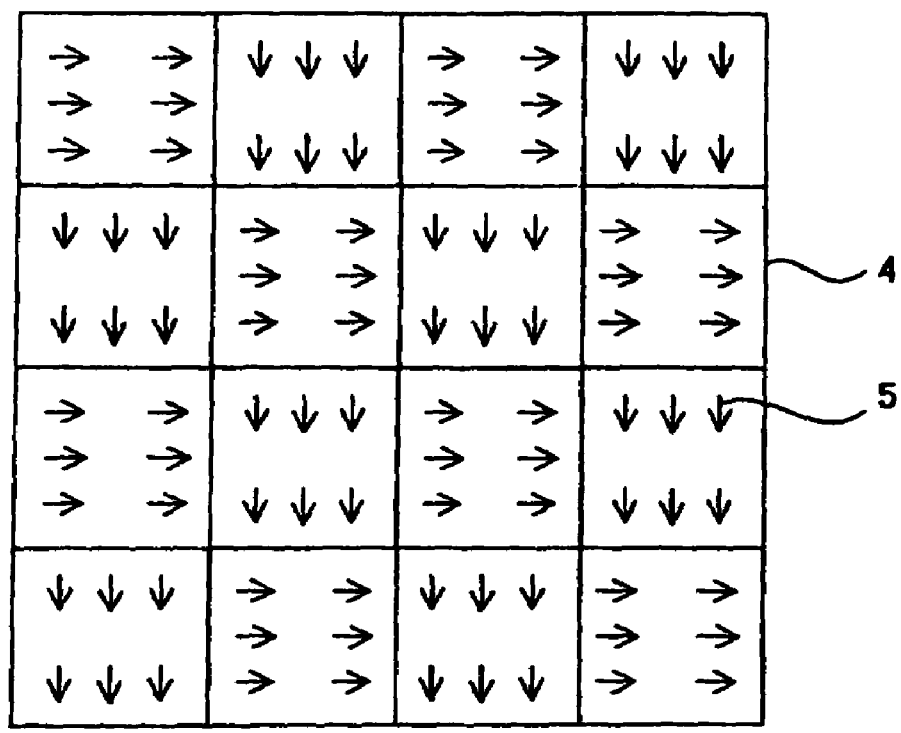
FIG. 4 is a schematic plan view of an oriented film with patterned orientation directions.

FIG. 4 is a model view showing an oriented film 4 formed with a pattern of different directions of orientation. Arrows 5 in the drawing indicate the directions of orientation. FIG. 4 shows one example in which the oriented film has a checked pattern, but various other patterns e.g., a striped pattern and the like, may be employed in accordance with the purposes of use in this invention.

By thus forming a pattern on the oriented film surface with different directions of orientation, the phase difference layer comprising a liquid crystal material having refractive index anisotropy provided thereon can have a pattern of refractive index anisotropy conforming to the pattern on the oriented film surface. As a result, a phase difference layer laminated body having portions with different phase differences in a certain pattern can be obtained, which can be used in various applications.

Patterning on the oriented film surface may be achieved by a rubbing technique using a mask, or in the case of using a film oriented with the irradiation of light beams, by a mask exposure technique or the like.

3. Others

In addition, the phase difference layer laminated body of the invention can be formed with other functional layers such as a protective layer or the like in accordance with the purposes for which the optical element is to be used.

If the phase difference layer laminated body of the invention is used as a λ/4 phase difference layer, it can be used as a circular polarization plate by bonding a polarization plate thereto with an adhesive layer interposed therebetween.

Figure 6:
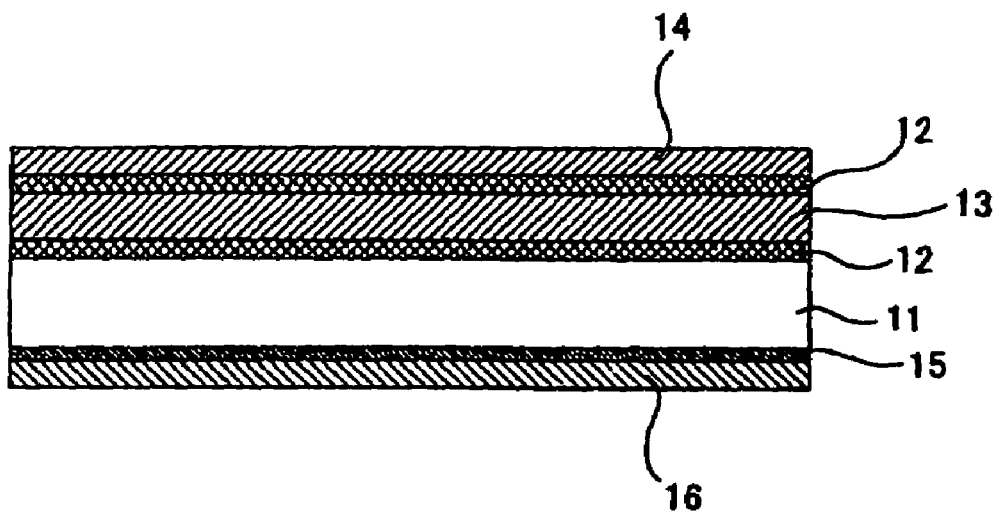
FIG. 6 is a schematic cross-sectional view showing one example of an optical element using a phase difference layer laminated body of the invention.
Figure 7:
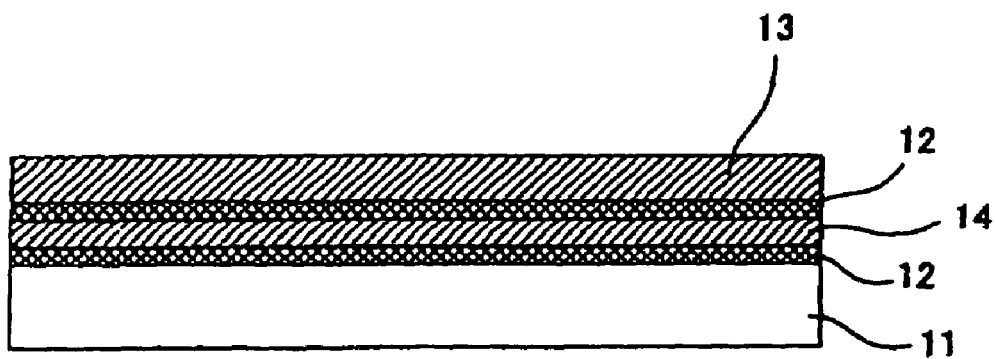
FIG. 7 is a schematic cross-sectional view showing another example of an optical element using a phase difference layer laminated body of the invention.

In this invention, also, as shown in FIG. 6 and FIG. 7, two or more phase difference layers can be laminated. In this case, preferably, the second phase difference layer is formed after the formation of an oriented film and rubbing treatment thereof on the first phase difference layer. The oriented film may be a photo-oriented film instead.

FIG. 6 shows an example in which a λ/2 phase difference layer 13 is formed on a glass substrate 11 with an oriented film 12 interposed therebetween, and a λ/4 phase difference layer 14 is further formed thereon with another oriented film 12 interposed therebetween. On the other hand, FIG. 7 shows an example in which a λ/4 phase difference layer 14 is formed on a glass substrate 11 with an oriented film interposed therebetween, and a λ/2 phase difference layer 13 is further formed thereon with another oriented film 12 interposed therebetween.

By projecting a linearly polarized beam to this phase difference layer laminated body from the side of the λ/2 phase difference layer 13 or a circularly polarized beam from the side of the λ/4 phase difference layer 14, the phase difference layer laminated body can function as a broadband phase difference plate shown, for example, in Japanese Patent Laid-Open Publication No. Hei 10-68816. Furthermore, by attaching a polarization plate on the opposite surface of the glass substrate 11 with an adhesive layer 15 interposed therebetween as shown in FIG. 6, it can function as a broadband circular polarization plate, with a non-polarized beam incident from the side of the polarization plate.

Note that, since the fast axes of the λ/2 phase difference layer 13 and λ/4 phase difference layer 14 need to be crossed approximately at 60° (60±10°), the two oriented films should be inclined to each other approximately at 60° (60±10°). This can be achieved by, for example, changing the direction of rubbing, or the like.

B. Method for Manufacturing a Phase Difference Layer Laminated Body

A method for manufacturing phase difference layer laminated body according to the invention is characterized by having:

a base material preparation step of preparing a base material;

an application step of applying a refractive index anisotropic material having an ability of providing refractive index anisotropy on the base material for forming a refractive index anisotropic material layer;

an orientation processing step of performing orientation processing to the refractive index anisotropic material layer; and an orientation fixing step of fixing the orientation of the refractive index anisotropic material layer that has undergone the orientation processing in the orientation processing step.

According to the method for manufacturing a phase difference layer laminated body of the invention, the orientation direction can be determined relatively freely in the orientation processing step, thus offering an advantage that phase difference layers of various different directions of fast axis (or slow axis) can be formed.

Figure 5:
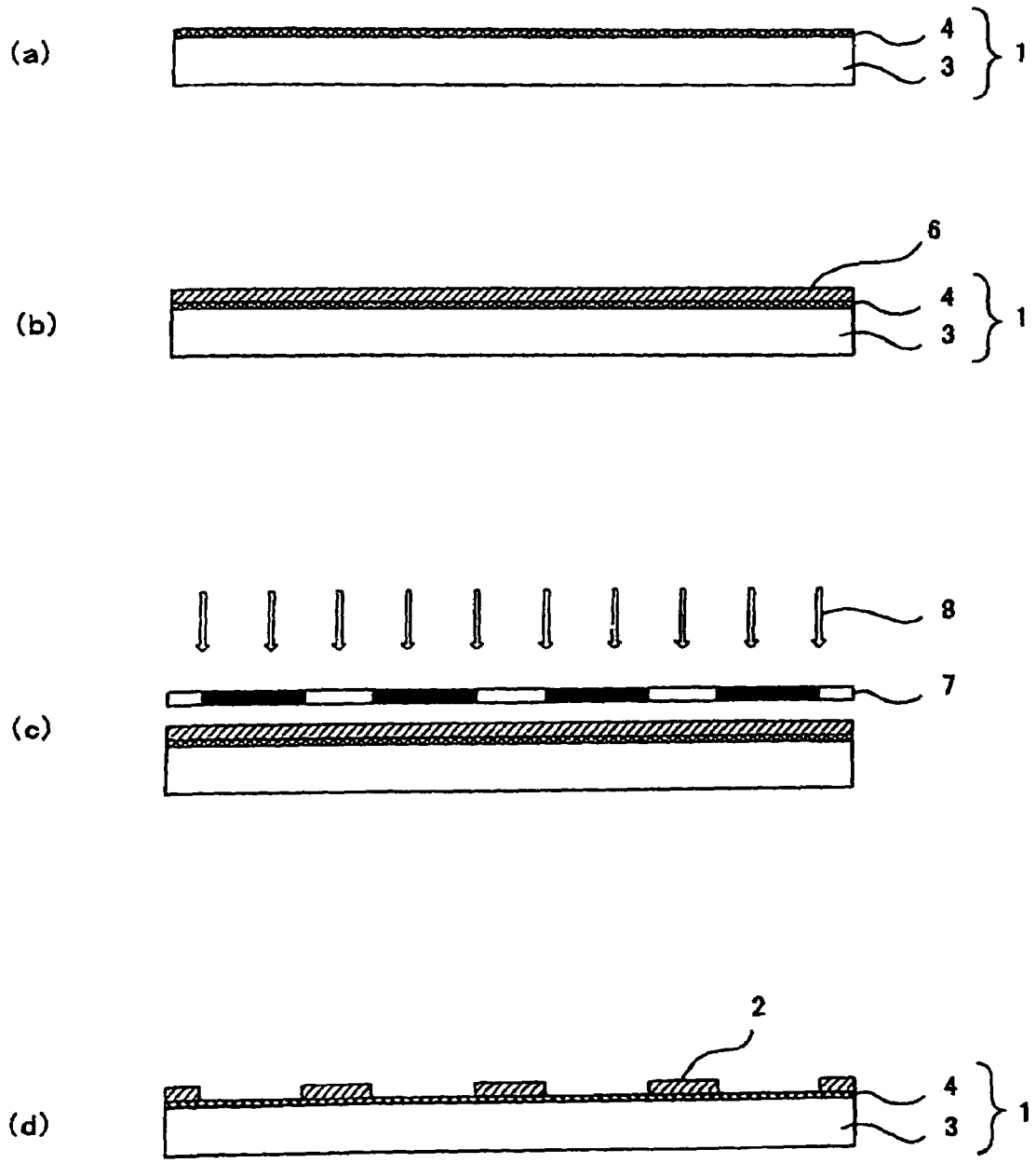
FIG. 5 is a diagram showing process steps of one example of a method for manufacturing a phase difference layer laminated body of the invention.

FIG. 5 shows one example of the method for manufacturing phase difference layers according to the invention. In this example, a base material 1 is first prepared, which includes a transparent substrate 3 on which is formed an oriented film 4, as shown in FIG. 5(a) (base material preparation step). Next, a refractive index anisotropic material layer 6 comprising a polymerizable liquid crystal material is formed on this base material 1 (application step). This is then let stand under a preset temperature for orienting the polymerizable liquid crystal material along the direction of orientation of the oriented film (orientation processing step). Next, with a photo mask 7 set thereon, an activating radiation beam 8 such as ultraviolet light or the like is irradiated, so that energy-radiated portions of the polymerizable liquid crystal material are cured in a certain pattern (as shown in FIG. 5(c), orientation fixing step), and lastly, it is developed using a solvent for forming the phase difference layer 2 in the certain pattern; a phase difference layer laminated body having a phase difference layer 2 in a pattern on a base material 1 is thus obtained.

The following is a more detailed description of each step of the manufacturing method of the phase difference layer laminated body according to the invention.

1. Base Material Preparation Step

The first step of the phase difference layer laminated body manufacturing method of the invention is the base material preparation step of preparing a base material.

In this invention, different types of base materials are used depending on the orienting method in the orientation processing step to be described later. That is, if the refractive index anisotropic material having an ability of providing refractive index anisotropy is a liquid crystal material and if the orienting method in the orientation processing step uses a base material having orientability, then it is necessary to prepare a base material having orientability. On the other hand, if another method is to be used for the orientation, then the base material need not have orientability.

Base materials having orientability will not be described here since they have already been described under the section "2. Base material having orientability" in "A. Phase difference layer laminated body" in the foregoing.

On the other hand, substrates in the case where no such orientability is required may suitably be selected in accordance with the purposes of use; since transparency is usually a requirement, a transparent and rigid material having no flexibility such as silica glass, Pyrex (registered trademark) glass, and synthetic silica glass, or a transparent and flexible material such as a transparent resin film, and optical resin sheet, or the like may be used, for example.

2. Application Step

The next step is the application step of applying a refractive index anisotropic material having an ability of providing refractive index anisotropy on the base material.

(Refractive Index Anisotropic Material)

The first example of the refractive index anisotropic material having an ability of providing refractive index anisotropy on the base material used in this invention is a liquid crystal material. The liquid crystal material is not described here since it has already been described under the section "1. Phase difference layer" in "A. Phase difference layer laminated body" in the foregoing.

For forming a refractive index anisotropic material layer using a polymerizable liquid crystal material, it is necessary to achieve polymerization using an activating radiation beam in the orientation fixing step to be described later. Depending on the type of the activating radiation beam, a photopolymerization initiator may be used as required, for instance in the case of UV curing. Specific examples of such a photopolymerization initiator are Irg 369, Irg 907, Irg 184 (trade name) and the like, manufactured by Ciba Specialty Chemicals Corp.

Refractive index anisotropic materials other than liquid crystal materials include materials that form layers and exhibit refractive index anisotropy when the molecules are more or less oriented in certain directions. Any materials that can usually be made to function as a phase difference layer by stretching may be used: Such materials include thermoplastic polymers such as polycarbonate polymers, polyester polymers such as polyarylate or polyethylene terephthalate, polyimide polymers, polysulfone polymers, polyethersulfon polymers, polystyrene polymers, polyolefin polymers such as polyethylene or polypropylene, polyvinyl alcohol polymers, cellulose acetate polymers, polyvinyl chloride polymers, and polymethylmethacrylate polymers.

In this invention, particularly, a refractive index anisotropic material that has relatively high polarity is preferable so that it can be oriented by applying a high electric or magnetic field in the orientation processing step to be described later for performing orientation processing. A specific example is a side-chain modified phonoxy resin into which 4-nitrophenyl carbamate is introduced.

(Application Method)

In the application step, for example, the above material is dissolved in a solvent or the like to form an application liquid, which is applied using various application methods such as spin coating, casting, dipping, bar coating, blade coating, roll coating, spray coating, and the like.

In the case of the application using a solvent, a drying step is necessary after the application for removing the solvent.

On the other hand, a refractive index anisotropic material that melts and liquefies at a temperature at which the material itself does not decompose or inflict damage on the base material, can be applied in a heated state without solvent. Same application methods as listed above can be used in this case, too.

In this invention, the more preferable method for the ease of handling is the method of dissolving the above-mentioned material in a solvent and applying the same. Because a polymerizable liquid crystal material is favorably used in this invention as noted above, it is particularly preferable to use a solution of this material as the application liquid.

Any solvents in which the above polymerizable liquid crystal material or the like can be dissolved, and which do not inhibit the orientability of the base material, may be used for this purpose.

Specific examples of solvents include hydrocarbons such as benzene, toluene, xylene, n-butylbenzene, diethylbenzene, and tetralin, ethers such as metoxybenzene, 1,2-dimetoxybenzene, and diethylene glycol dimethylether, ketones such as acetone, methylethylketone, methylisobutylketone, cyclohexanone, and 2,4-pentanedion, esters such as ethyl acetate, ethylene glycol monomethyl ether acetate, propylene glycol monomethyl ether acetate, propylene glycol monoethyl ether acetate, and γ-butyrolactone, amide solvents such as 2-pyrrolidone, N-methyl-2-pyrrolidone, dimethyl formamide, and dimethylacetamide, halogenated solvents such as chloroform, dichloromethane, carbon tetrachloride, dichloroethane, tetrachloroethane, trichloroethylene, tetrachloroethylene, chlorobenzene, and ortho-dichlorobenzene, alcohols such as t-butylalcohol, diacetone alcohol, glycerin, monoacetin, ethylene glycol, triethylene glycol, hexylene glycol, ethylene glycol monomethyl ether, ethyl cellosolve, and butyl cellosolve the like, phenols such as phenol, and para-chlorophenol; these can be used either alone or in combination.

The solubility of the polymerizable liquid crystal material or the like may not be sufficient, or the above substrate having orientability may be corroded with the use of a single type of solvent. Such troubles can be avoided by using a mixture of two or more types of solvents. Among the above-listed solvents, hydrocarbon solvents and glycol mono ether acetate solvents are favorably used alone, while ethers and ketones are favorably used in mixture with glycols. There is no generic rule regarding the concentration of the solution because it should be determined depending on the solubility of liquid crystal compositions and the film thickness of phase difference layers to be fabricated; it is, however, usually within a range of 1 to 60% by weight, and more preferably 3 to 40% by weight.

In this invention, there may be cases where the phase difference layer should preferably be formed in a certain pattern on the substrate as described above. In such a case, a nozzle discharge technique such as an inkjet method or the like, or a printing technique such as photogravure or the like may be employed in this application step for patterned application. In the case where a highly precise pattern is needed, the base material may undergo a preparatory step of forming a pattern consisting of hydrophilic regions and water-repellent regions for giving wettability, the patterned application being made to the hydrophilic regions.

3. Orientation Processing Step

The next step, in this invention, is the orientation processing step of performing orientation processing to the refractive index anisotropic material layer applied on the base material. The orientation processing step according to the invention includes two methods: One method uses a base material having orientability, the other achieves orientation by applying force to molecules of the refractive index anisotropic material. Each method is respectively described below.

(Method Using a Base Material Having Orientability)

This method using a base material having orientability can be employed in the orientation processing step of the invention when the above-described liquid crystal material is used for the refractive index anisotropic material.

In the case of using a base material having orientability, the refractive index anisotropic material, or the liquid crystal material in this case, formed on the base material having orientability is heated to a temperature at which it can form a liquid crystal phase, the temperature being maintained the same until the liquid crystal material is oriented along directions defined by the base material.

The temperature and duration of time for which it is maintained depend largely on the liquid crystal material used and the orientability of the base material; they should suitably be set in accordance with the types of the liquid crystal material and base material having orientability.

Incidentally, a base material comprising a transparent substrate and an oriented film formed thereof to have orientability can be used with favorable results because of a wider range of selection of orientation direction or the direction of fast axis (or slow axis) of phase difference layer, and because the use of the oriented film makes possible to give a pattern to the orientation directions, as has been described under the section "2. Base material having orientability" in "A. Phase difference layer laminated body" in the foregoing.

(Orienting Method with Application of Force to Molecules)

In this invention, apart from the method using a base material having orientability, the refractive index anisotropic material having an ability of providing refractive index anisotropy can be oriented by a method of applying force to molecules.

In this orienting method of applying force to molecules, after heating the refractive index anisotropic material formed on the base material in the above application step to a temperature at least exceeding a temperature Tg at which molecules are movable inside the layer, force is applied to the molecules to orient them in certain directions.

Examples of such a force applying method include a method of applying a powerful electrostatic field, and a method of applying a powerful magnetic field, and the like.

While the above method using a base material having orientability can use only a liquid crystal material as the refractive index anisotropic material, this method can employ, not only liquid crystal materials, but also any material that has an ability of providing refractive index anisotropy.

If an electrostatic field is to be used, for example, for applying a force to the molecules, a refractive index anisotropic material having a molecular structure that can receive a force induced by an electrostatic field may be used; specifically, a material having polarity may be used. Similarly, if a magnetic field is to be used, a refractive index anisotropic material having a molecular structure that can receive a force induced by a magnetic field may be used; in this case also, a material having polarity may be used. The material, in this case, should have refractive index anisotropy as well as polarity, but it should not be limited to a polymer material; for example, a polymerizable monomer or oligomer may also be used. Any material can be used as long as it exhibits refractive index anisotropy by polymerization by, e.g., irradiation of an activating radiation beam in a state where the molecules are oriented by an electric or magnetic field.

According to this method, the orientation direction, i.e., the direction of fast axis (or slow axis) of phase difference layer, can readily be changed, e.g., by control of the position of an electromagnetic or magnetic field. Orientation is therefore possible in any direction, whereby the resultant phase difference layer laminated body has a merit that it can be used in a very wide range of applications.

4. Orientation Fixing Step

In this invention, an orientation fixing step is carried out for fixing the given orientation of the refractive index anisotropic material layer that has undergone the above orientation processing.

This orientation fixing step may be performed along with the orientation processing step, or after the orientation processing step has been completed. If, for example, the above orientation processing step employs a method using an electrostatic field, then the orientation fixing step, in which temperature is lowered in this case, may be performed while applying the electrostatic field.

In this invention, the orientation fixing step is carried out in different manners depending on the refractive index anisotropic material being used. Specifically, there are two cases; one is that the refractive index anisotropic material is a polymerizable material, and the other is that it is a non-polymerizable polymer material. Both cases, wherein the refractive index anisotropic material is a polymerizable material, and a non-polymerizable polymer material, are separately described below.

(Polymerizable Material)

In this invention, for the refractive index anisotropic material, polymerizable liquid crystal materials such as polymerizable monomers, polymerizable oligomers, and polymerizable liquid crystal polymers are preferably used as noted above.

In the orientation fixing step in which such a polymerizable liquid crystal material is used, an activating radiation beam, which promotes polymerization, is irradiated to the refractive index anisotropic material layer comprising the polymerizable liquid crystal material formed on the base material having orientability. "Activating radiation beam" mentioned in this invention means radiation rays that are capable of inducing polymerization in a polymerizable material, which may contain, if required, a polymerization initiator.

In this invention, a preferable method is that UV ray is used as the activating radiation beam for a polymerizable liquid crystal material, which contains a polymerization initiator that generates radicals for inducing radical polymerization upon irradiation of the UV rays. This is because the method using UV ray as the activating radiation beam is a well-established technique including the polymerization initiator used therewith, and can readily be applied to this invention.

This orientation fixing step with irradiation of an activating radiation beam may be performed at the same processing temperature as that in the above orientation processing step, i.e., the temperature at which the polymerizable liquid crystal material transforms into a liquid crystal phase, or lower than that. A temperature drop after the polymerizable liquid crystal material has transformed into a liquid crystal phase does not cause a disorder in the orientation.

Other polymerizable materials that have no liquid crystal properties may also be used for the polymerizable material as noted above; the orientation fixing step can be performed similarly in this case, too.

(Non-Polymerizable Polymer Material)

The refractive index anisotropic material having an ability of providing refractive index anisotropy can be a non-polymerizable polymer material when, for example, it is a liquid crystal material other than the above-mentioned polymerizable liquid crystal materials, i.e., one of commonly known non-polymerizable liquid crystal polymers.

The orientation fixing step in the case of using such a liquid crystal polymer is a step of lowering the temperature at which the polymer transforms into a liquid crystal phase to the temperature at which the polymer transforms into a solid phase. In the above orientation processing step, by the orientation processing, the liquid crystal polymer has transformed into a liquid crystal phase having a nematic structure along the orientation defined by the base material having orientability. In this state, by setting the temperature at which liquid crystal transforms to a glass state, the polymer can be made into a phase difference layer having, as a whole, refractive index anisotropy.

On the other hand, if the above orientation processing step employs an orienting method with application of force to molecules, fixing of the orientation of molecules can similarly be achieved by lowering the temperature in the oriented state. Thereby, a phase difference layer having, as a whole, refractive index anisotropy can be obtained. The temperature, in this case, should preferably be lowered to a level lower than the glass transition temperature Tg.

(Patterning of Phase Difference Layer)

In this invention, depending on the purposes of use, the phase difference layer formed on the base material may be required to have a certain pattern, as mentioned above. Patterning may be achieved in the above application step as described above, but in terms of pattern precision, it is preferable to perform the patterning in this orientation fixing step. That is, in the case of using the above-mentioned polymerizable material, patterning of the phase difference layer can readily be achieved by irradiation of the activating radiation beam in a pattern for forming polymerized portions in a pattern, followed by a development step using a solvent or the like.

Examples of solvents that can be used for the development include acetone, 3-methoxybutyl acetate, diglyme, cyclohexanone, tetrahydrofuran, toluene, methylene chloride, and methyl ethyl ketone or the like.

A favorable method of irradiating the material with the activating radiation beam in a pattern is a method using a photo mask as shown in FIG. 5, but it is not limited to this; a laser beam, for example, may be used as the activating radiation beam, the irradiation being performed as if to draw a line.

In this invention, if the development is performed using the solvent or the like thereafter, then it is preferable that the cured portions of the polymerizable liquid crystal material have cured to a degree of 85% by the above activating radiation beam. Thereby, deterioration of optical characteristics of the cured portions or swelling thereof during the development thereafter using a solvent are effectively prevented.

In the case of using a non-polymerizable material, on the other hand, patterning may be achieved by a photolithography technique using a photoresist.

5. Others

By the above orientation fixing step, a phase difference layer laminated body having a phase difference layer on the base material is obtained: In this invention, further, other functional layers such as a protective layer may be added according to needs.

Also, if the phase difference layer laminated body of the invention is a λ/4 phase difference layer, a further step may be included for bonding a polarization plate with an adhesive layer thereto. Thereby, circular polarization plates can be fabricated.

Furthermore, since the phase difference layer laminated body may have two or more laminated phase difference layers as shown in FIG. 6 and FIG. 7, the above application step, orientation processing step, and orientation fixing step may be repeated twice or more. If the orientation processing is achieved by the use of an oriented film as with the examples shown in FIG. 6 and FIG. 7, it is preferable to perform an oriented film formation step after the orientation fixing step.

C. Liquid Crystal Display Device

The liquid crystal display device of the invention is characterized by the use of a phase difference layer laminated body described in the section "A. Phase difference layer laminated body" above, and particularly, a preferable embodiment is a liquid crystal display device using a phase difference layer laminated body having the phase difference layer formed in a pattern on the base material.

As described above, the phase difference layer laminated body using a polymerizable liquid crystal material, particularly a polymerizable liquid crystal monomer, can readily be formed with a phase difference layer formed on the base material in a highly precise pattern, by patterned irradiation of an activating radiation beam using, e.g., a photo mask, in the orientation fixing step; a liquid crystal display device in which is incorporated such a phase difference layer laminated body having a phase difference layer in a highly precise pattern will have an unrivaled high quality.

One example of a liquid crystal display device is a three-dimensional liquid crystal display device shown, for example, in Japanese Patent Laid-Open Publication No. Hei 9-304740; the phase difference layer laminated body having a patterned phase difference layer on a base material may be used for the phase difference plates of this device that cover the entire liquid crystal display panel in a striped manner.

Another example is a projection type display device shown, for example, in Japanese Patent Laid-Open Publication No. Hei 8-234205; the phase difference layer laminated body having a patterned phase difference layer on a base material may be used for the λ/2 phase difference plates formed in a pattern in this projection type display device.

Figure 8:
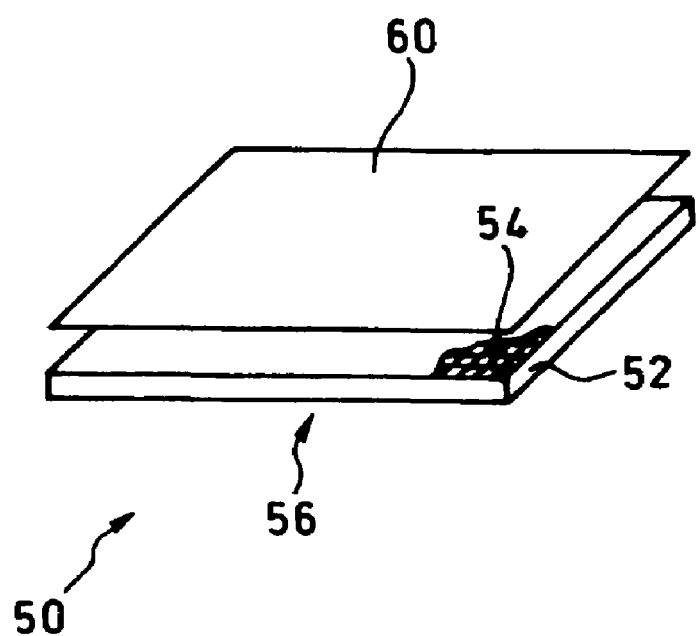
FIG. 8 is an exploded perspective view showing the schematic construction of a liquid crystal display device according to one embodiment of the invention.
Figure 9:
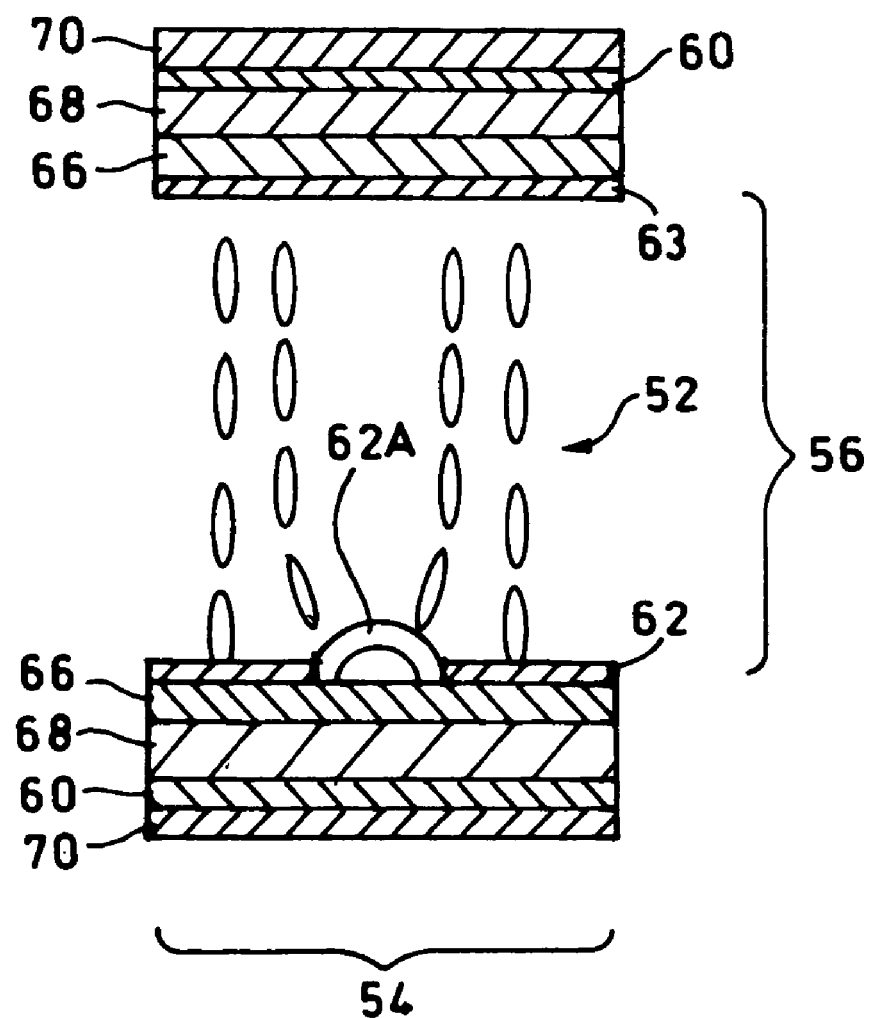
FIG. 9 is an enlarged side cross-sectional view showing the essential construction of the liquid crystal display device.
Figure 10:
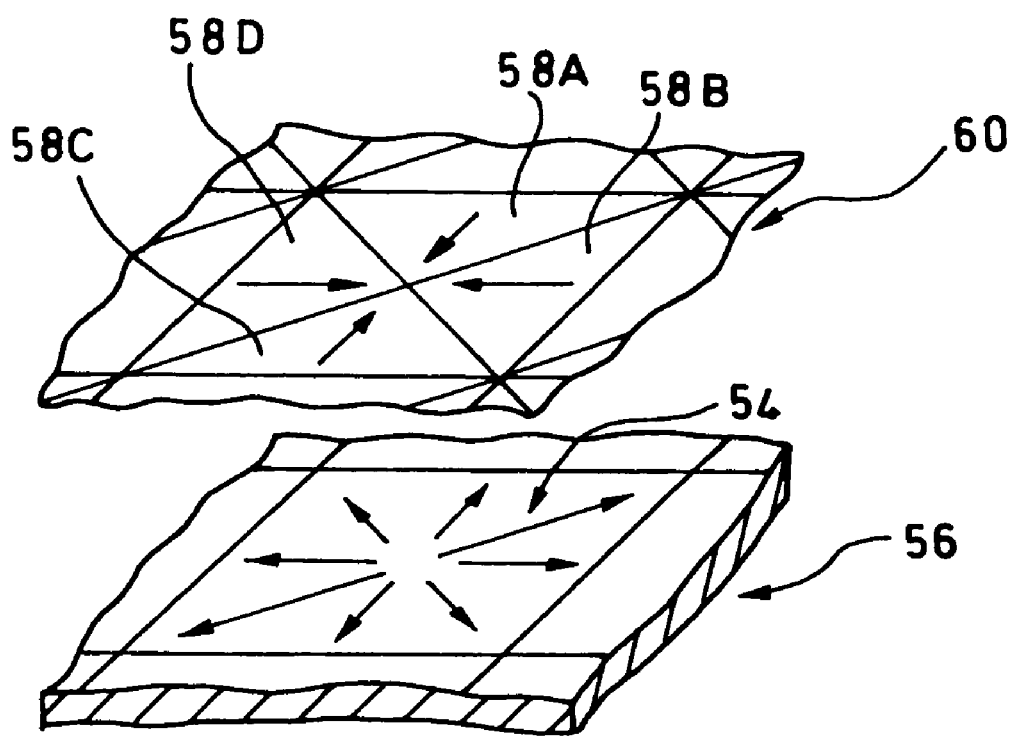
FIG. 10 is a perspective view showing oriented compensation regions in the liquid crystal display device.
Figure 11:
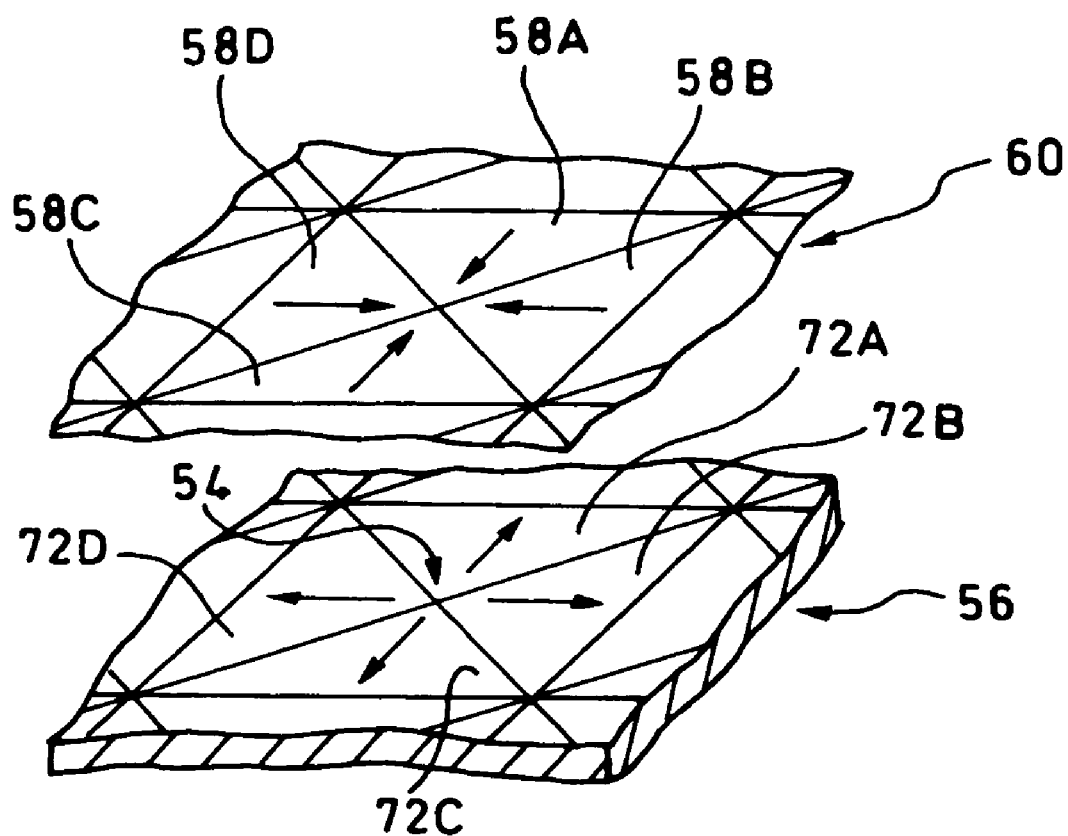
FIG. 11 is a perspective view showing oriented display regions and oriented compensation regions in the liquid crystal display device.

Yet another preferred embodiment is a liquid crystal display device 50 shown in FIG. 8 to FIG. 10, including the following: A liquid crystal display element 56 including a liquid crystal layer 52 and a plurality of unit cells 54 that constitute a multiplicity of pixels, liquid crystal molecules on the surface of the liquid crystal layer 52 being oriented with a plurality of different directors in directions indicated by arrows in FIG. 10 in each of the unit cells 54; and phase difference layers (phase difference optical elements) 60 arranged on both sides in the thickness direction of the liquid crystal display element 56, the phase difference layers divided into a plurality of (four in this embodiment) oriented compensation regions 58A, 58B, 58C, 58D in accordance with the directions of the liquid crystal directors in each unit cell 54, the liquid crystal substance being oriented and fixed in each of the oriented compensation regions 58A, 58B, 58C, 58D.

The liquid crystal display element 56 is an MVA type; it has the liquid crystal layer 52 sealed between a pair of oriented films 62, 63, as shown in FIG. 9. Reference numerals 66, 68, and 70 denote transparent electrodes, transparent base material, and polarization plates, respectively.

Further, as shown in FIG. 10, the liquid crystal molecules on the surface of the liquid crystal layer 52 are oriented with the directors in symmetric directions relative to the center of each unit cell 54. Specifically, one of the oriented films 62 is formed with a semi-spherical rib 62A protruded at the center of each cell 54, as shown in FIG. 9, and the liquid crystal molecules on the surface of the liquid crystal layer 52 are oriented at angles radiating from the rib 62A.

Each unit cell 54 has four oriented compensation regions 58A, 58B, 58C, 58D that are defined by dividing the unit cell 54 into a plurality of (four in this embodiment) sections with an equal angular spacing around the center, and the liquid crystal substance divided into these oriented compensation regions 58A, 58B, 58C, 58D is oriented and fixed.

By thus orienting the molecules in the phase difference layer 60 for each of the oriented compensation regions 58A, 58B, 58C, 58D in accordance with the directions of the liquid crystal directors of the liquid crystal layer 52, optical compensation is made possible in more precise and various ways than conventionally practiced, whereby the problem of viewing -angle dependency is much improved and high-quality image display is realized.

Divisional orientation and fixation of the liquid crystal substance to form the oriented compensation regions may be achieved either by coating a liquid crystal substance having nematic properties on the substrate and orienting it in a certain direction using an electrostatic or magnetic field, followed by a fixing step of irradiating UV rays or the like using a photo mask, these steps being repeated for each of the oriented compensation regions; or, by coating the liquid crystal substance on an oriented film that has been processed to have different orientation directions for each of the oriented compensation regions by a mask rubbing technique, followed by fixing of the liquid crystal in the oriented state.

In this embodiment, the liquid crystal molecules on the surface of the liquid crystal layer 52 are oriented with the directors in symmetric directions relative to the center of each unit cell 54, but one alternative is to divide each unit cell 54 of the liquid crystal display element 56 into a plurality of (four in this embodiment) oriented display regions 72A, 72B, 72C, 72D, the liquid crystal molecules on the surface of the liquid crystal layer 52 being oriented in respective directions of the oriented display regions 72A, 72B, 72C, 72D, and to form the oriented compensation regions 58A, 58B, 58C, 58D correspondingly to the oriented display regions 72A, 72B, 72C, 72D.

Orientation processing of the oriented film to form the oriented display regions 72A, 72B, 72C, 72D with different orientation directions may be achieved by the use of a square pyramid rib, or by a known photo-oriented film method or the like.

By thus orienting the molecules in the phase difference layer for each of the oriented compensation regions in accordance with the orientation of liquid crystal molecules of each of the oriented display regions, even more precise optical compensation can be realized.

In the above embodiment, each unit cell 54 of the liquid crystal display element 56 is divided into four oriented display regions, but the invention is not limited to this; for example, a triangular prism or pyramid rib may be formed on the oriented film to divide each unit cell of the liquid crystal display element into two or three oriented display regions, or, a polygonal pyramid rib of more than five base sides may be formed on the oriented film to divide each unit cell of the liquid crystal display element into five or more oriented display regions. It goes without saying that the effect of improving display quality is also obtained in these cases.

Incidentally, the semi-spherical rib 62A mentioned above divides each unit cell of the liquid crystal display element into an infinite number, as it were, of oriented display regions.

Similarly, each unit cell of the phase difference layer may be divided into two or three oriented display regions, or it may be divided into five or more oriented compensation regions.

In the above embodiment, the phase difference layer 60 has four oriented compensation regions 58A, 58B, 58C, 58D corresponding to the four oriented display regions 72A, 72B, 72C, 72D of the unit cell 54 of the liquid crystal display element 56, but the invention is not limited to this; a plurality of oriented compensation regions of optical compensation elements may be provided relative to one oriented display region in the unit cell. Thereby, even more precise and variant optical compensation can be realized.

Also, although the phase difference layers 60 are arranged on both sides in the thickness direction of the liquid crystal display element 56 in the above embodiment, the invention is not limited to this; the phase difference layer may be arranged only on one side in the thickness direction of the liquid crystal display element, depending on the manner in which optical compensation is carried out.

Also, although the liquid crystal display element 56 is an MVA type in the above embodiment, the invention is not limited to this; the invention can obviously be applied to other types of liquid crystal display elements including other VA types such as a PVA type, and TN type, STN type, IPS type, OCB type, and ECB type or the like.

Furthermore, the invention should not be limited to the above-described embodiments, which were given only by way of example; the technical scope of the invention includes any other constructions substantially identical to and having similar effects as those of the technical ideas defined by the claim of the invention.

For example, while the material used for the phase difference layer has been described as a liquid crystal material that can form a nematic phase under the section "A. Phase difference layer laminated body" above, any liquid crystal material that does not form a cholesteric phase can be used without any problems in this invention; thus a liquid crystal material that forms a smectic phase should also be included in the definition of liquid crystal in this invention.

EXAMPLE

An example will be described below for further explanation of the invention.

A solution of polymerizable liquid crystal monomer in toluene was prepared, the monomer having a mesogen in the center, polymerizable acrylate at either end, and a spacer linking therebetween, and having a liquid crystal-isotropic transition temperature (temperature at which liquid crystal transforms into an isotropic phase) of 100° C. Note that, a photopolymerization initiator (Irg 184: Ciba Specialty Chemicals Corp.) was added to the above solution in toluene in an amount of 5% by weight relative to the monomer molecules.

Meanwhile, polyimide was applied on a glass substrate to form a coat, which then underwent rubbing treatment in certain directions, to form an oriented film.

This glass substrate with the oriented film was then set in a spin coater, and the above solution in toluene was applied onto the oriented film to a thickness of about 5 µm by spin coating.

Next, the substrate was heated at 80° C. for one minute to vaporize toluene in the solution, after which it was confirmed that the liquid crystal film (uncured liquid crystal film) formed on the oriented film was in a nematic phase.

UV rays were then irradiated at 100 mJ/cm$^2$ to the uncured nematic liquid crystal film by a UV irradiation apparatus, with the use of a photo mask having openings in a certain pattern. The UV irradiation intensity was set so that UV-irradiated portions of the nematic liquid crystal film would polymerize (cure) to a degree of 90% or more.

Thereafter, the glass substrate with the oriented film formed with the nematic liquid crystal film was immersed in acetone with rocking motion applied thereto for one minute so as to remove uncured portions of the nematic liquid crystal film.

Finally, the above glass substrate was taken out from acetone and dried; a phase difference layer laminated body having a phase difference layer with a desired pattern was thus fabricated, the nematic liquid crystal film being formed in UV-irradiated portions, while the oriented film being exposed in other portions.

Incidentally, the nematic liquid crystal film formed in this example had a substantially uniform film thickness of 1.5 µm, and the pattern was formed with a very high degree of precision.

INDUSTRIAL APPLICABILITY

According to the present invention, a liquid crystal material that can form a nematic phase is used for forming a phase difference layer in a pattern, and orientation directions are readily determined by selecting the type of liquid crystal materials and base materials having orientability; thus the invention provides a phase difference layer laminated body that can be applied to various optical elements.

The invention claimed is:
1. A liquid crystal display device, comprising:
   a liquid crystal display element including a liquid crystal layer and comprising a plurality of unit cells that constitute a multiplicity of pixels, each of the unit cells having at least one oriented film with a rib having one of a semispherical shape, a triangular prism shape and a polygonal pyramid shape protruded at the center thereof, liquid crystal molecules on a surface of said liquid crystal layer being oriented by the rib at angles radiating therefrom; and a phase difference optical element arranged at least on one side in a thickness direction of said liquid crystal display element, the phase difference optical element being divided into a plurality of oriented compensation regions, wherein the phase difference optical element includes a base material having orientability and a phase difference layer made of a liquid crystal material that can form a nematic phase, and the phase difference layer is formed in a pattern on the base material so as to form at least two different oriented compensation regions, and the liquid crystal material has different directions of refractive index anisotropy in the at least two different oriented compensation regions in the same phase difference layer and fixed in that state.

2. The liquid crystal display device according to claim 1, wherein said each unit cell of said liquid crystal display element is divided into a plurality of oriented display regions, the liquid crystal molecules on the surface of said liquid crystal layer being oriented in different directions of directors for each of said oriented display regions, and wherein said oriented compensation regions are formed in said phase difference optical element corresponding to said oriented display regions.

3. The liquid crystal display device according to claim 2, wherein a plurality of said oriented compensation region is formed in said phase difference optical element relative to one said oriented display region of said unit cell.

4. The liquid crystal display device according to claim 1, wherein the liquid crystal molecules on the surface of said liquid crystal layer of said liquid crystal display element are oriented with the directors in symmetric directions relative to respective centers of the unit cells.

5. The liquid crystal display device according to claim 4, wherein the oriented compensation regions of said phase difference optical element are formed in such a manner as to divide said each unit cell into four or more sections with an equal angular spacing around a center of said each unit cell.

6. The liquid crystal display device according to claim 1, wherein the oriented compensation regions of said phase difference optical element are formed in such a manner as to divide said each unit cell into four or more sections with an equal angular spacing around respective centers of the unit cells.

7. The liquid crystal display device according to claim 6, wherein a pair of 180° opposite oriented compensation regions relative to the center of said each unit cell of said phase difference optical element are oriented in the opposite direction.

8. The liquid crystal display device according to claim 1, wherein said liquid crystal display element is driven by a method of one of TN type, STN type, VA type, MVA type, PVA type, IPS type, OCB type, and ECB type.

9. The liquid crystal display device according to claim 1, wherein said phase difference optical element comprises a base material having orientability, and a phase difference layer made of a liquid crystal material that can form a nematic phase and formed in a pattern on said base material such as to have refractive index anisotropy.

10. The liquid crystal display device according to claim 9, wherein the liquid crystal material that can form a nematic phase of said phase difference layer laminated body is obtained by polymerization of at least one of a polymerizable liquid crystal monomer, a polymerizable liquid crystal oligomer, and a polymerizable liquid crystal polymer.

11. The liquid crystal display device according to claim 9, wherein the liquid crystal material that can form a nematic phase of said phase difference layer laminated body is obtained by polymerization of a polymerizable liquid crystal monomer.

12. The liquid crystal display device according to claim 9, wherein the base material having orientability of said phase difference layer laminated body is obtained by forming an oriented film on a transparent substrate.

13. The liquid crystal display device according to claim 12, wherein the oriented film of said phase difference layer laminated body is formed in a pattern with portions that are oriented in at least two different directions, and wherein said liquid crystal material on said oriented film has refractive index anisotropy that conforms to the plurality of directions of orientation of said oriented film.

14. The liquid crystal display device according to claim 9, wherein the base material having orientability of said phase difference layer laminated body is a stretched film.

15. A liquid crystal display device, comprising:

a liquid crystal display element including a liquid crystal layer and comprising a plurality of unit cells that constitute a multiplicity of pixels, each of the unit cells having at least one oriented film with a rib having one of a semispherical shape, a triangular prism shape and a polygonal pyramid shape protruded at the center thereof, liquid crystal molecules on a surface of said liquid crystal layer being oriented by the rib at angles radiating therefrom; and a phase difference optical element arranged at least on one side in a thickness direction of said liquid crystal display element, the phase difference optical element being divided into a plurality of oriented compensation regions wherein the phase difference optical element includes a base material having orientability and a phase difference layer made of a liquid crystal material that can form a nematic phase, the phase difference layer is formed in a pattern on the base material such as to form at least two different oriented compensation regions, the liquid crystal material has different directions of refractive index anisotropy in the at least two different oriented compensation regions in the same phase difference layer and fixed in that state, and said each unit cell of said liquid crystal display element is divided into a plurality of oriented display regions, the liquid crystal molecules on the surface of said liquid crystal layer being oriented in different directions of directors for each of said oriented display regions, and wherein said oriented compensation regions are formed in said phase difference optical element corresponding to said oriented display regions.

* * * * *